US008929683B2

(12) United States Patent
Gallo et al.

(10) Patent No.: US 8,929,683 B2
(45) Date of Patent: *Jan. 6, 2015

(54) TECHNIQUES FOR REGISTERING AND WARPING IMAGE STACKS

(71) Applicant: NVIDIA Corporation, Santa Clara, CA (US)

(72) Inventors: Orazio Gallo, Soquel, CA (US); Kari Pulli, Palo Alto, CA (US); Jun Hu, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,357

(22) Filed: Apr. 30, 2013

(65) Prior Publication Data
US 2014/0118402 A1 May 1, 2014

Related U.S. Application Data

(63) Continuation-in-part of application No. 13/660,931, filed on Oct. 25, 2012.

(51) Int. Cl.
G06K 9/36 (2006.01)
G06K 9/32 (2006.01)
G06T 5/50 (2006.01)
G06T 5/00 (2006.01)

(52) U.S. Cl.
CPC . *G06T 5/50* (2013.01); *G06T 5/005* (2013.01); *G06T 2207/20208* (2013.01); *G06T 2207/20221* (2013.01)
USPC .............................. 382/276; 382/293; 382/298

(58) Field of Classification Search
CPC .............................. G06K 9/6206; G06T 7/0012
USPC .......................................................... 382/215
See application file for complete search history.

(56) References Cited

U.S. PATENT DOCUMENTS

| 5,812,705 A | * | 9/1998 | Wang et al. | 382/294 |
| 6,219,444 B1 | * | 4/2001 | Shashua et al. | 382/154 |
| 6,301,377 B1 | * | 10/2001 | Taylor, Jr. | 382/129 |
| 6,793,350 B1 | * | 9/2004 | Raskar et al. | 353/121 |
| 8,155,399 B2 | * | 4/2012 | Liu et al. | 382/118 |

* cited by examiner

Primary Examiner — Alex Liew
(74) Attorney, Agent, or Firm — Patterson & Sheridan, LLP

(57) ABSTRACT

A set of images is processed to modify and register the images to a reference image in preparation for blending the images to create a high-dynamic range image. To modify and register a source image to a reference image, a processing unit generates correspondence information for the source image based on a global correspondence algorithm, generates a warped source image based on the correspondence information, estimates one or more color transfer functions for the source image, and fills the holes in the warped source image. The holes in the warped source image are filled based on either a rigid transformation of a corresponding region of the source image or a transformation of the reference image based on the color transfer functions.

20 Claims, 12 Drawing Sheets

TECHNIQUES FOR REGISTERING AND WARPING IMAGE STACKS

CROSS-REFERENCE TO RELATED APPLICATIONS

This application is a continuation-in-part of co-pending U.S. patent application Ser. No. 13/660,931, filed Oct. 25, 2012, the aforementioned related patent application is hereby incorporated herein by reference.

BACKGROUND OF THE INVENTION

1. Field of the Invention

The invention generally relates to image processing and, more specifically, to techniques for registering a set of images taken of a scene using different exposure settings to a reference image.

2. Description of the Related Art

Many digital photography applications require a user to capture multiple images of the same scene (i.e., an image stack) using different camera settings. One common application that requires the capture of multiple images is high-dynamic range imaging (HDR). In HDR, multiple images are captured of the same scene using different camera settings for each image. For example, images can be captured using a range of exposure settings. In any single image captured at a particular exposure level, details may be lost in the bright or dark areas of the image. HDR captures these details by stitching or performing a weighted average of the different areas of the scene captured in different images taken using different exposure levels. For example, a low exposure setting may capture more detail in bright areas of the scene while a high exposure setting may capture more detail in dark areas of the scene.

However, one problem with capturing multiple images of the same scene is that the images are typically captured at different times. Because most scenes are dynamic, objects captured at a location in one image may be at a different location in the next image. If the objects in the scene have a large amount of relative motion between images then the algorithms for generating the HDR images may have difficulty determining which pixels in one image correspond to pixels in a different image. Therefore, these image applications usually have the best results when applied to static scenes and where the position of the camera is static between each of the pictures.

In today's world, most people carry and capture images using handheld cameras. Images can be captured using expensive digital single-lens reflex (SLR) cameras or image sensors built into the body of a cellular phone. In other words, most images are captured using hand held devices, which users do not take the time to immobilize with a tripod or other device. Consequently, not only are the objects in the scene dynamic and moving relative to other objects in the scene, but the position of the scene is dynamic relative to the position of the camera.

Conventional HDR algorithms that generate an image from multiple images of a dynamic scene may cause blending artifacts to appear in the generated image. For example, ghosted objects could appear in multiple locations in the blended HDR image. In another example, the blended HDR image could have a blurry appearance overall resulting from camera motion that occurs between capture of consecutive images. Such ghosted object and blurry images result in a blended HDR image with reduced image quality.

Accordingly, what is needed in the art is a more effective approach for registering and modifying the images of an image stack.

SUMMARY OF THE INVENTION

One embodiment of the present invention sets forth a method for registering a set of images for use in high-dynamic range imaging. The method includes receiving the set of images, where the set of images includes a reference image and a source image, generating a global homography between the source image and the reference image that indicates a correspondence between a subset of pixels in the source image and a subset of pixels in the reference image, generating a warped source image by mapping a set of pixels in the source image to a set of target pixels in the warped source image, wherein the warped source image includes one or more hole regions comprising pixels in the warped source image that are not associated with the set of pixels in the source image, and estimating one or more color transfer functions for the source image based on the difference between intensity values associated with the set of pixels in the source image and intensity values associated with the corresponding set of target pixels in the warped source image. The method also includes filling one or more hole regions of the warped source image based on at least one of the source image or the reference image.

Another embodiment of the present invention sets forth a computer readable storage medium including instructions that, when executed by a processing unit, causes the processing unit to perform the method set forth above. Yet another embodiment of the present invention sets forth a system including storing a set of images and a processing unit configured to perform the method set forth above.

One advantage of the disclosed method is that the source images are warped using robust and computationally efficient techniques that blend together global correspondences, local rigid transformation estimates, and synthesized results from a reference image and a source image. The combination of disclosed global and detailed registration techniques may be implemented efficiently and may provide more robust results with less computational effort than conventional registration techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the present disclosure. However, it will be apparent to one of skill in the art that some embodiments of the invention may be practiced without one or more of these specific details.

System Overview

Figure 1:
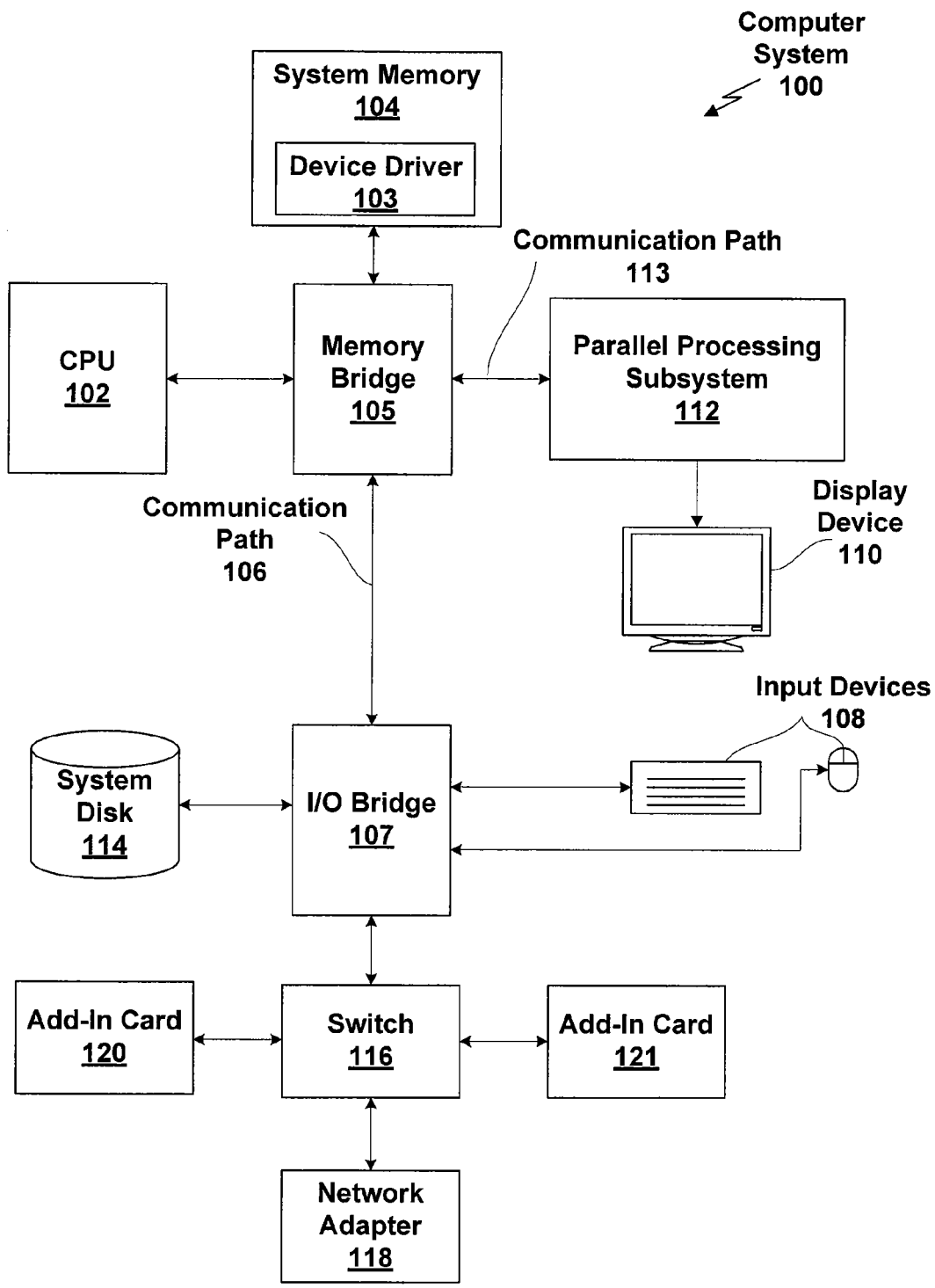
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system-on-chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
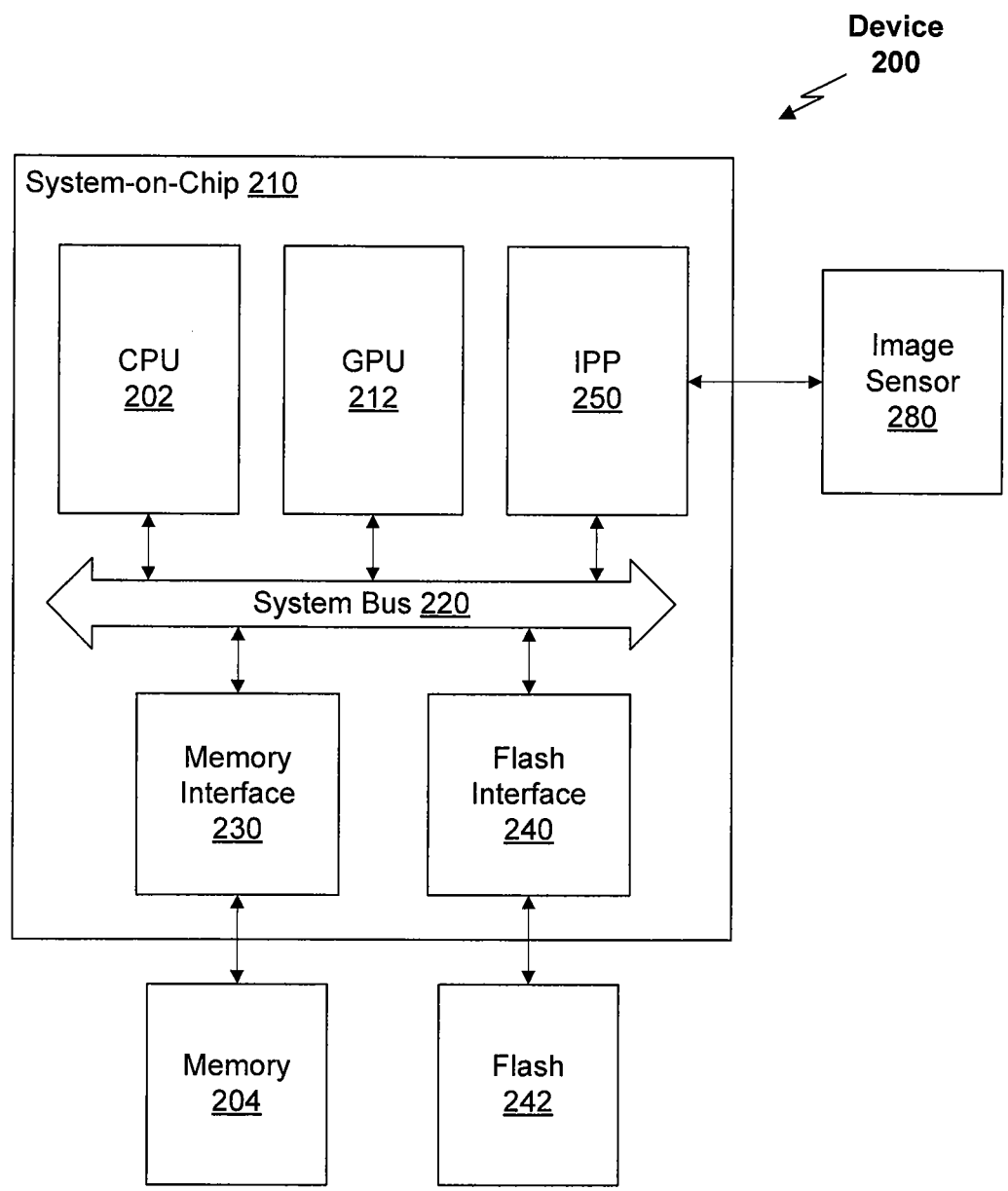
FIG. 2A is a block diagram of a hand-held device configured to implement one or more aspects of the present invention.

FIG. 2A is a block diagram of a hand-held device 200 configured to implement one or more aspects of the present invention. Device 200 could be a tablet computer, digital camera, smart phone, personal digital assistant (PDA), or other mobile electronic device. In one embodiment, device 200 includes a system-on-chip 210, a memory 204, a flash memory 242, and an image sensor 280. Memory 204 comprises one or more memory modules for temporary storage of volatile data. In one embodiment, memory 204 comprises one or more dynamic random access memory (DRAM) modules. Flash memory 242 comprises a flash memory device and provides non-volatile, long term storage of data. In some embodiments, flash memory 242 may be replaced with other types of non-volatile memory such as read-only memory (ROM), solid state drives, optical discs (e.g., CD-ROM), SD (Secure Digital) cards, and the like. It will be appreciated that data, as used herein, refers to both program instructions and raw data processed by the instructions.

As shown in FIG. 2A, SoC 210 includes a central processing unit (CPU) 202, a graphics processing unit (GPU) 212, a memory interface 230, a flash interface 240, an image processing pipeline 250, and a system bus 220. Each of the components of SoC 210 may communicate with one or more of the other components via the system bus 220. SoC 210 is implemented on a single silicon substrate and may be included in an integrated circuit package that provides an interface to a printed circuit board that includes external interconnects to the other components of device 200. In one embodiment, CPU 202 is a reduced instruction set computer (RISC) such as an ARM™ Cortex-A9 32-bit multi-core microprocessor. CPU 202 has one or more cores (e.g., 1, 2, 4, etc.) and may be multi-threaded to execute two or more instructions in parallel. In other embodiments, CPU 202 may be a MIPS based microprocessor or other type of RISC processor.

CPU 202 retrieves data from memory 204 via memory interface 230. In one embodiment, memory interface 230 includes a cache for temporary storage of data from memory 204. Memory interface 230 implements a 32-bit DDR (double data rate) DRAM interface that connects to memory 204. CPU 202 may also retrieve data from flash memory 242 to be written into memory 204 via flash interface 240 that, in one embodiment, implements an Open NAND Flash Interface (ONFI) specification, version 3.1. It will be appreciated that flash interface 240 may be replaced by other types of interfaces for flash memory or other non-volatile memory devices, as required to interface with the particular type of non-volatile memory included in device 200. For example, flash interface 240 could be replaced by an IDE (Integrated Drive Electronics) interface (i.e., Parallel ATA) for connection to a solid state drive (SSD) in lieu of flash memory 242.

In one embodiment, SoC 210 includes a GPU 212 for processing graphics data for display on a display device, such as an LCD (Liquid Crystal Display), not explicitly shown. The GPU 212 implemented in SoC 210 may be a low-power version of a discrete GPU such as parallel processing subsystem 112. The GPU 212 includes a plurality of streaming processors configured to efficiently process highly parallel tasks, such as pixel processing. GPU 212 may be configured to write processed pixel data to a frame buffer in memory 204. A video interface, not shown, may then be configured to read the pixel data from the frame buffer and generate video signals to transmit to a display device included in device 200 or connected to device 200 via an interface such as an HDMI (High-Definition Multimedia Interface) interface.

In some embodiments, device 200 also includes an image sensor 280 for capturing digital images. SoC 210 may transmit signals to image sensor 280 that cause image sensor 280 to sample pixel sites on the image sensor 280 that indicate a level of a particular wavelength or wavelengths of light focused on the pixel site. The level may be expressed as a level of luminosity of either a red, green, or blue channel and transmitted to SoC 210 as raw image sensor data. In one embodiment, image sensor 280 is a CMOS (Complementary Metal Oxide Semiconductor) image sensor. In another embodiment, image sensor 280 is a CCD (charge-coupled device) image sensor. It will be appreciated that image sensor 280 may be included in an image sensor assembly that includes, in addition to the image sensor 280, one or more of a lens, a shutter mechanism, a filter, and the like. Some image sensor assemblies may include more than one lens, or the ability for a user to attach various lens to the image sensor assembly that focus light on the surface of the image sensor 280.

As shown in FIG. 2A, raw image sensor data may be transmitted to an image processing pipeline (IPP) 250 for processing. In one embodiment, SoC 210 includes IPP 250 as a discrete hardware unit within the single silicon substrate. In another embodiment, SoC 210 implements the functions of IPP within instructions executed within CPU 202 and/or GPU 212. IPP 250 will be described below in more detail in conjunction with FIG. 2B.

Figure 2B:
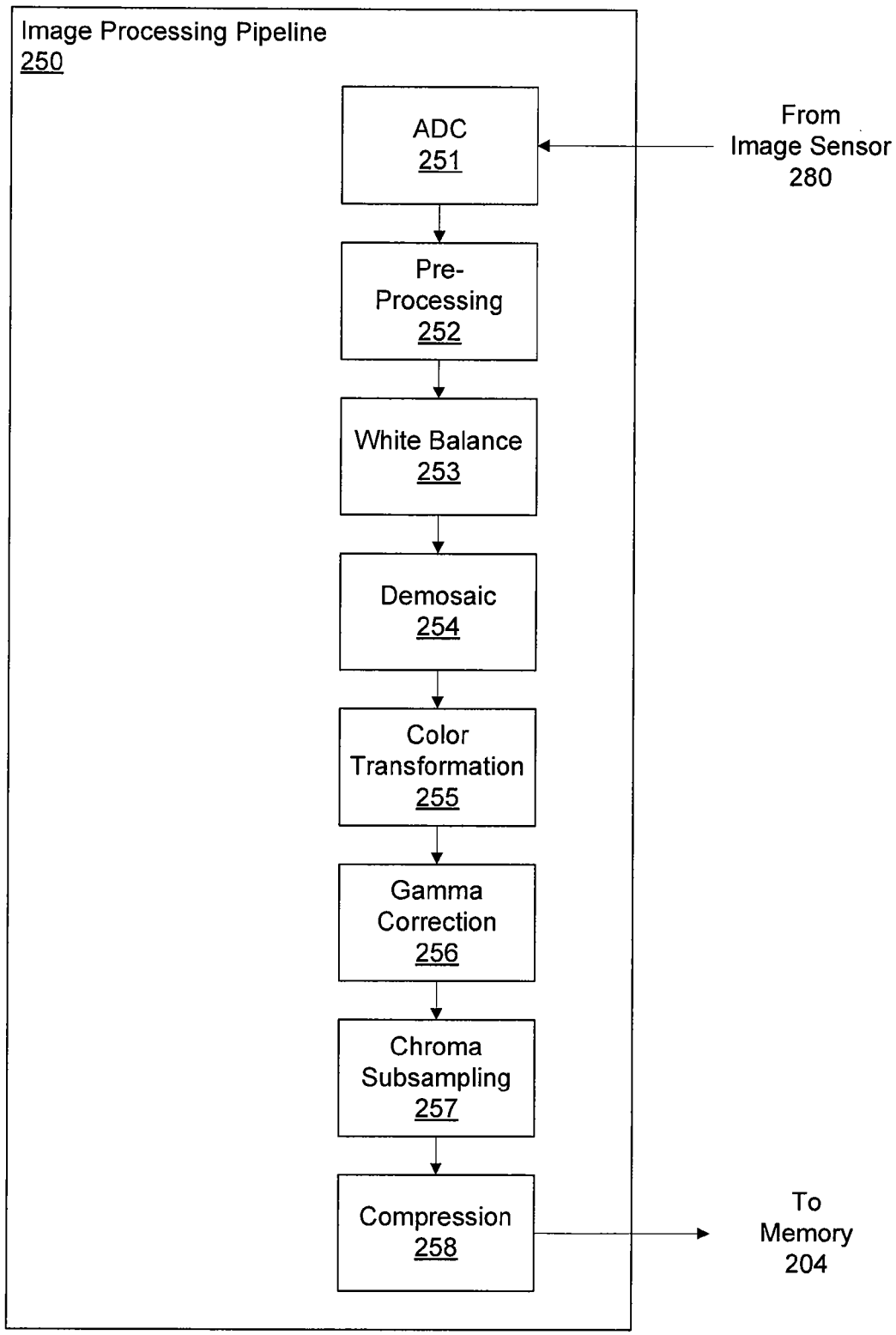
FIG. 2B is block diagram of the image processing pipeline implemented by the device of FIG. 2A, according to one embodiment of the present invention.

FIG. 2B is block diagram of the image processing pipeline implemented by the digital camera of FIG. 2A, according to one embodiment of the present invention. As shown in FIG. 2B, IPP 250 includes an analog to digital converter (ADC) 251, a pre-processing engine 252, a white balance engine 253, a demosaicing engine 254, a color transformation engine 255, a gamma correction engine 256, a chroma subsampling engine 257, and a compression engine 258. ADC 251 receives the raw image sensor data and, for each pixel site, converts an analog signal into a digital value (i.e., an intensity value). In one embodiment, ADC 251 has a resolution of eight or more bits and converts the analog signal for each pixel site into an 8-bit intensity value between 0 and 255. In another embodiment, ADC 251 is built into the image sensor assembly and digital values are transmitted to IPP 250 via a serial interface.

Pre-processing engine 252 implements various processing algorithms based on the raw image sensor data. In one embodiment, pre-processing engine 252 implements a filter to reduce cross-talk between pixel sites. In another embodiment, pre-processing engine 252 implements a noise reduction algorithm. In yet other embodiments, pre-processing engine 252 implements an image cropping or image scaling algorithm. It will be appreciated that various camera manufacturers will include one or more processing algorithms in the pre-processing engine 252 of IPP 250. White balance engine 253 adjusts the intensity values for each color channel to account for the color temperature of a light source. For example, fluorescent lighting and natural sunlight cause the same colored object to appear different in a digital image. White balance engine 253 can adjust the intensity values for each pixel to account for differences in the light source.

Most image sensors include a color filter array such that each pixel site of the image sensor is associated with a single color channel. For example, a Bayer Filter Mosaic includes two green filters, one red filter, and one blue filter for every 2×2 array of pixel sites on the image sensor. Each pixel site of the raw image sensor data is associated with only one color (e.g., red, green, or blue). Demosaicing engine 254 applies a special kernel filter to sample a plurality of pixel sites to generate each pixel of a digital image, where each pixel is associated with three or more color channels (e.g., RGB, CMYK, etc.). Demosaicing engine 254 decreases the spatial resolution of the digital image in order to generate pixels of blended colors.

Color transformation engine 255 transforms the digital image generated by demosaicing engine 254 from a non-linear, device dependent color space, to a linear, device-independent color space. For example, RGB is a non-linear, device dependent color space. The function of the color transformation engine 255 is to map the non-linear color space of the image sensor 280 to a standard, linear color space such as sRGB. Color transformation engine 255 transforms each pixel value (i.e., a vector of multiple color channels) by application of a 3×3 color transformation matrix to generate a transformed pixel value.

Gamma correction engine 256 adjusts the intensity values of the pixels of the digital image such that the digital image, when displayed on a display device with a non-linear response, properly reproduces the true colors of the captured scene. Chroma subsampling engine 257 divides the three chrominance channels of the transformed pixels into a single luminance channel and two color difference channels. Because human vision responds more to luminance than chrominance, the two color difference channels can be stored with less bandwidth than the luminance channel without reducing the overall quality of the digital image. Compression engine 258 receives the uncompressed digital image from the chroma subsampling engine 257 and generates a compressed digital image for storage in memory 204. In one embodiment, the compression engine 258 compresses the image using a JPEG (Joint Pictures Expert Group) codec to generate a JPEG encoded digital image file.

It will be appreciated that the number and order of the engines within the IPP 250 may be changed in various embodiments. In some embodiments, images will be stored in a RAW image format and demosaicing engine 254 is not implemented in IPP 250. In other embodiments, chroma subsampling engine 257 and compression engine 258 are not implemented as the digital image is stored in an uncompressed bitmap storing pixel values in the sRGB color space. It will be appreciated that various applications require different combinations of processing algorithms and that other processing engines, not described herein, may be added to or included in lieu of the processing engines described above.

High Dynamic Range Image Stack

Figure 3:
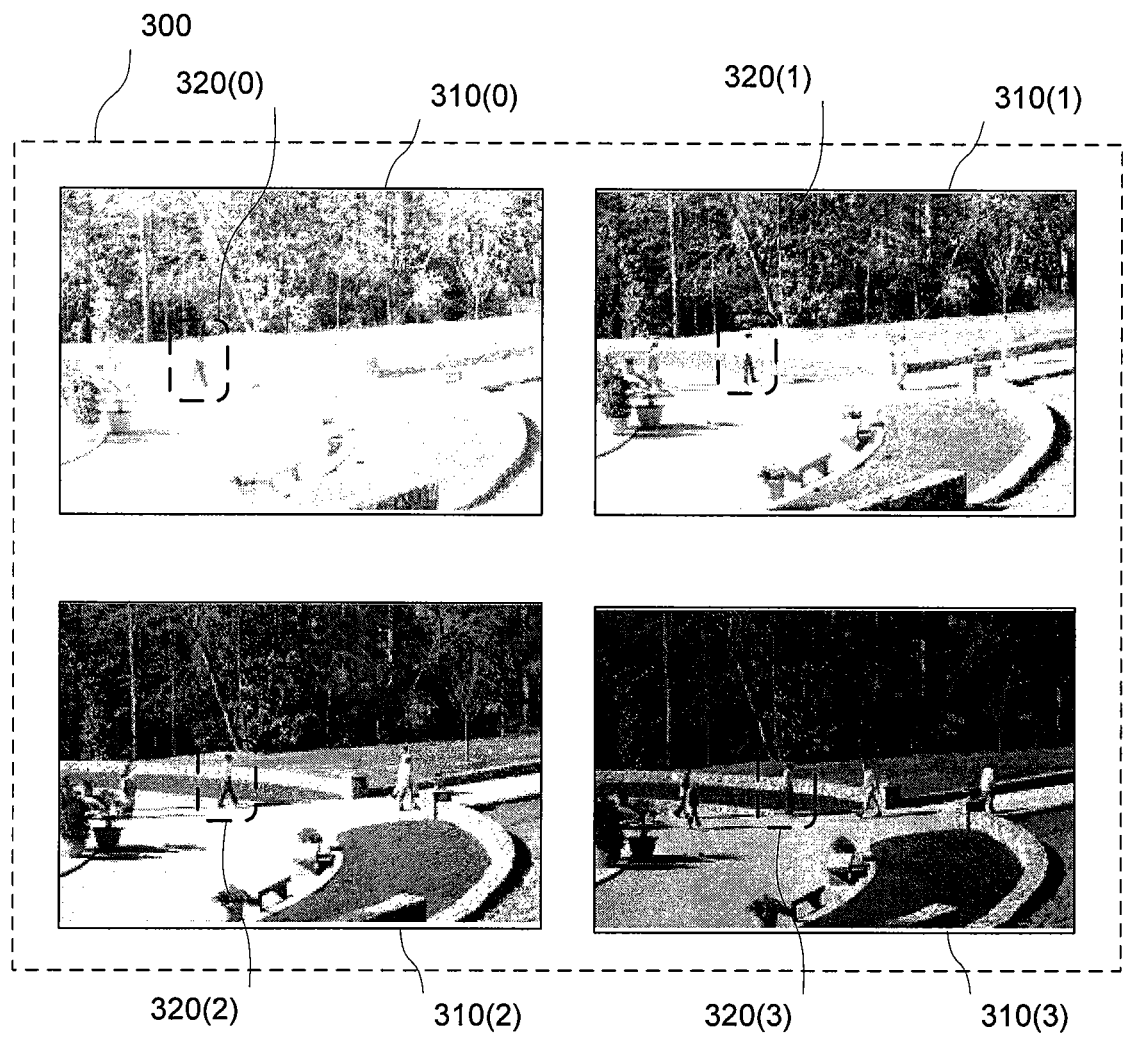
FIG. 3 illustrates an image stack captured by the device of FIG. 2A, according to one embodiment of the present invention.

High dynamic range imaging (HDR) uses multiple images taken with different camera settings to generate a composite image with higher dynamic range than the image sensor is capable of capturing in a single image. In one application, an image stack may be captured by taking pictures of the same scene and adjusting an exposure level between each successive image. FIG. 3 illustrates an image stack 300 captured by the device 200 of FIG. 2A, according to one embodiment of the present invention. As shown in FIG. 3, image stack 300 includes four separate images captured with different exposure levels. A first image 310(0) is captured with a high exposure level. A longer exposure means that the intensity levels for each pixel will be higher as more light strikes the surface of the image sensor 280. As a consequence of the longer exposure setting, many pixels in the first image 310(0) are saturated, meaning the pixel value is completely white (i.e., 255, 255, 255) or close to white. In brighter areas of the scene, details are lost because of the long exposure, but, in darker areas of the scene, details are more visible. For example, details at the tree line may be more visible due to the longer exposure level.

Image stack 300 also includes a second image 310(1) having a lower relative exposure level than the first image 310(0). In the second image 310(0), more details in the brighter areas of the scene become visible. The benches and the flower pots in the scene show more detail in the second image 310(1). Image stack 300 also includes a third image 310(2) and a fourth image 310(3) with successively lower exposure levels. In each successive image 310 in the image stack 300, more details in the brightest areas of the scene emerge. Although only four images are shown in image stack 300, image stack 300 may include any number of images greater than two, where each image in the image stack is captured using different camera settings.

Each image 310 in image stack 300 is captured at different times. Capturing image stacks 300 of dynamic scenes introduces one problem with blending the images because the objects in one image are located at a different location in each image. For example, a person is located at a first location 320(0) in the first image 310(0), a second location 320(1) in the second image 310(1), a third location 320(2) in the third image 310(2), and a fourth location 320(3) in the fourth image 310(3). In addition, the moving objects may appear different in the different images and, therefore, are not simply the product of a translation, but may change in shape. For example, the person has his legs apart in the third image 310(2) but his legs together in the fourth image 310(3) because the person is walking during the capture of the image stack 300. Furthermore, the relative position of the image sensor 280 to the scene can change between images. As is apparent from examining the stone wall at the bottom of the second image 310(1) and the fourth image 310(3), even the position of stationary objects in one image does not correspond to the position of the objects in the other images.

Figure 4A:
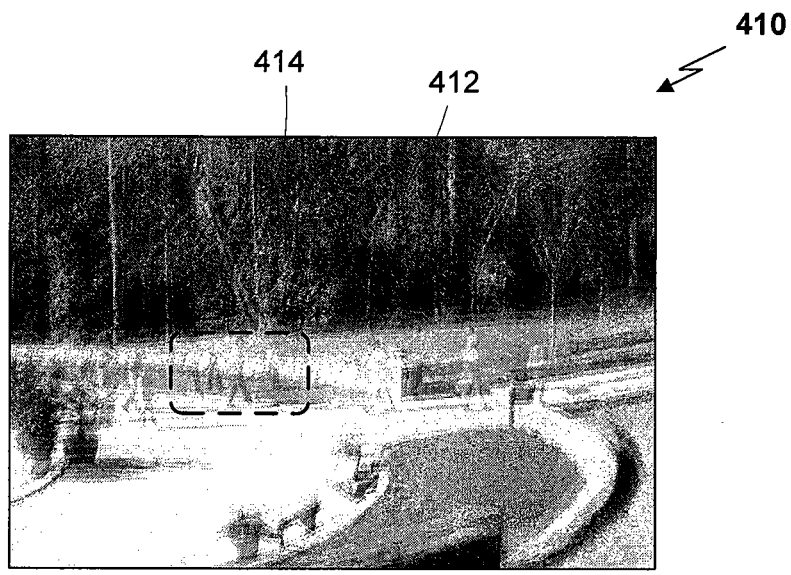
FIG. 4A illustrates a blended image generated using a conventional image processing algorithm for HDR images, according to the prior art.

FIG. 4A illustrates a blended image 410 generated using a conventional image processing algorithm for HDR images, according to the prior art. As discussed above, the images 310 of the image stack 300 are slightly shifted due to camera motion. As shown in FIG. 4A, when objects in one image appear in different locations in another image, the objects appear blurry or ghosted when blended without compensating for the objects' motion. In one example, the overall blurry appearance of the blended image 410, as exemplified in the blurry appearance of the forested background 412, could result from camera motion between the capture of consecutive images 310 of the image stack 300. In another example, the disparate locations 320 of the person shown in the consecutive images 310 of the image stack 300 could result in ghosted images 414 of the person in the resulting blended image 410. As a result, the blended image 410, although including image data having a higher dynamic range, is not suitable for viewing.

Figure 4B:
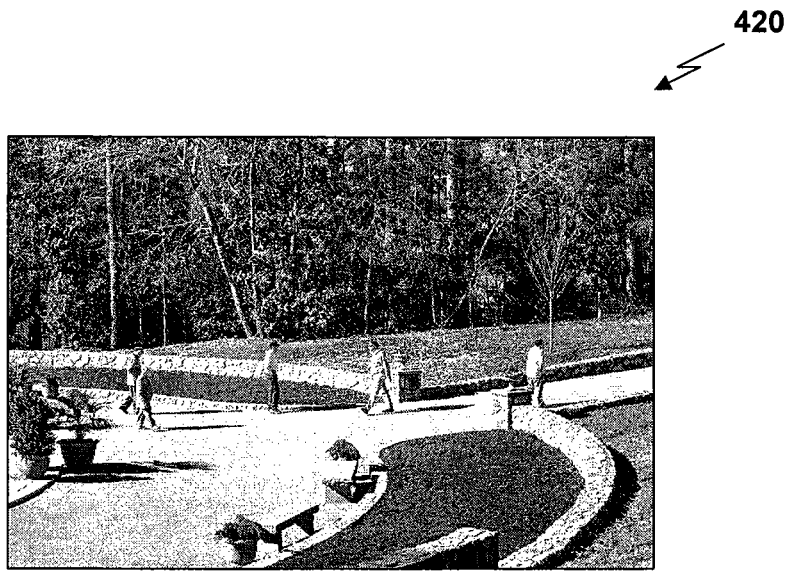
FIG. 4B illustrates a blended image generated using an image processing algorithm, according to one embodiment of the present invention.

FIG. 4B illustrates a blended image 420 generated using an image processing algorithm, according to one embodiment of the present invention. In contrast to the blended image 410, the blended image 420 is crisp and objects appear clear without any associated ghosting. The blended image 420 also has a higher dynamic range when compared to the images 310 of image stack 300. Details appear vivid in both the bright areas of the scene and the darker areas of the scene. The image processing algorithm, discussed in more detail below, accounts for both camera motion and object motion within the scene.

Image Processing Algorithm

Figure 5:
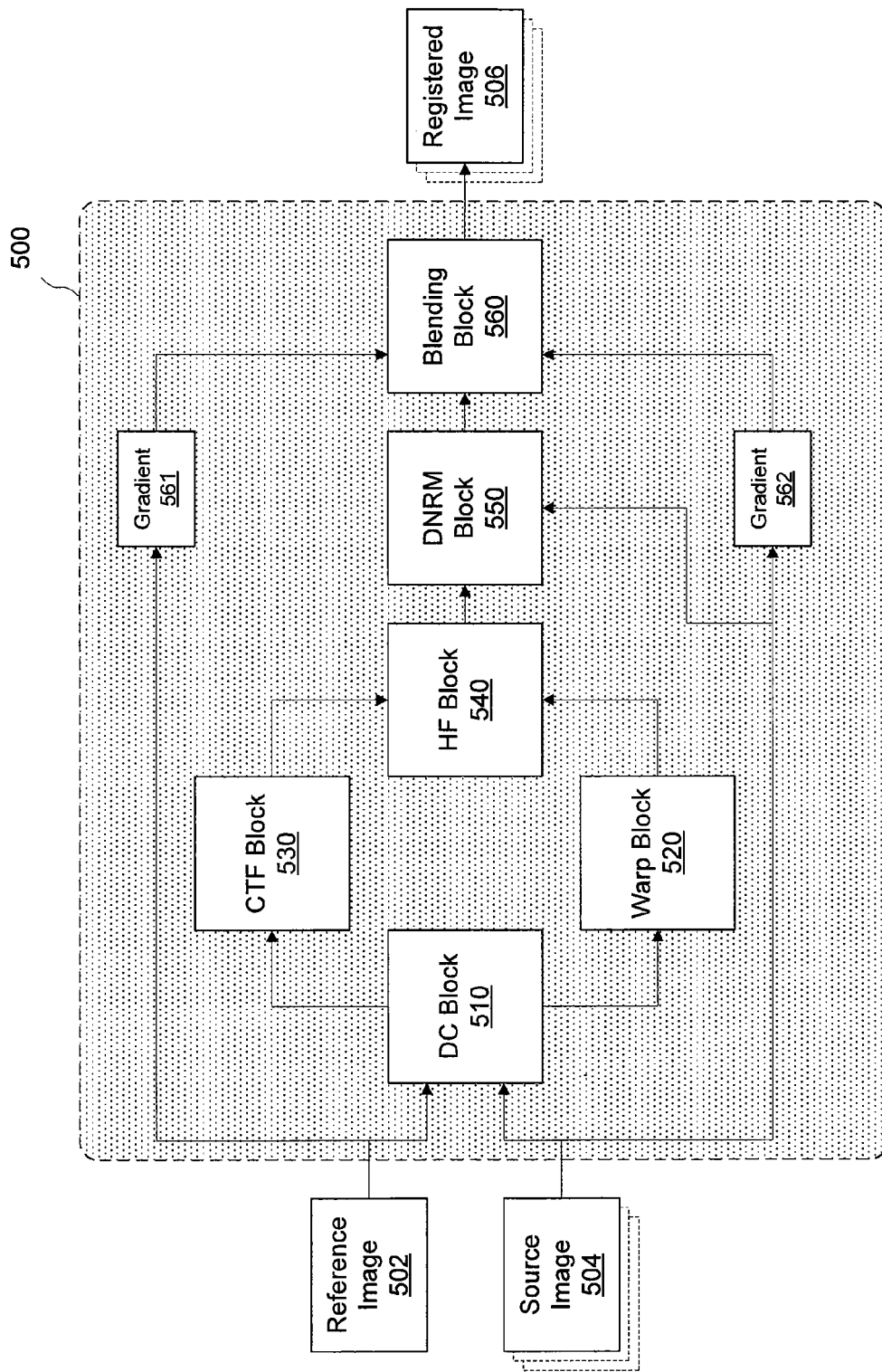
FIG. 5 is a block diagram of an image processing algorithm used to generate the blended image of FIG. 4B, according to one embodiment of the present invention.

FIG. 5 is a block diagram of an image processing algorithm 500 used to generate the blended image 420 of FIG. 4B, according to one embodiment of the present invention. The image processing algorithm 500 warps and modifies each image in an image stack to align each image with a selected reference image. Unlike conventional HDR image processing algorithms, the disclosed image processing algorithm 500 attempts to preserve as much information from each image 310 in the image stack 300 as possible. The image processing algorithm 500 does not require radiometric calibration and is thus suitable for approaches that fuse images in the luminance domain, in addition to being suitable for approaches that fuse images in the irradiance domain.

The image processing algorithm 500 takes a reference image 502 and one or more source images 504 as input. For example, the fourth image 310(3) of the image stack 300 could be selected as the reference image 502 and the first image 310(0), second image 310(1), and the third image 310(2) could be selected as the source images 504. The image processing algorithm outputs one or more registered images 506 that are registered to the reference image 502 and have a dynamic range that resembles the corresponding source image 504.

Prior to processing the image stack 300 with the image processing algorithm 500, the reference image 502 is selected. In one embodiment, the reference image 502 may be selected automatically by selecting the image 310 in the image stack 300 having the fewest number of over-saturated or under-saturated pixels. In another embodiment, the reference image 502 may be manually selected by a user. It will be appreciated that the selection of the reference image 502 can affect the quality of the registered images 506 at the output. For example, selecting a reference image 502 that is washed out (over-saturated) or too dark (under-saturated) could cause the image processing algorithm 500 to fail. In another example, the reference image 502 could be selected based on a preferred configuration of the scene, in that the configuration of the reference image 502 would influence the configuration of the blended image 420.

Once the reference image 502 is selected, the reference image 502 and the source images 504 are transmitted to the dense correspondence (DC) block 510, which establishes a dense correspondence between pixels (or regions of pixels) of the source image 504 and pixels (or regions of pixels) of the reference image 502. In an embodiment, the DC block 510 may implement a non-rigid dense correspondence (NRDC) approach. In one embodiment, DC block 510 implements a coarse-to-fine correspondence algorithm that repeats four steps at different scales ranging from a coarse scale to a fine scale. The four steps are (1) nearest-neighbor search, (2) region aggregation, (3) color transform fitting, and (4) search range adjustment. First, in the nearest-neighbor search, for each pixel (or region of pixels) in the source image 504, the reference image 502 is searched over a constrained range to determine a closest match for the region in the source image 504. The range may be constrained in terms of the maximum size of the translation, scale, rotation, color range, etc. Once each region in the source image 504 is matched to a corresponding region in the reference image 502, consistent groups of matching regions are aggregated to form patches of reliably consistent regions. For example, adjacent regions in the source image 504 are reliably consistent when their nearest neighbor field transformations (i.e., motion vectors) are similar. In other words, when the nearest-neighbor search algorithm determines that two adjacent regions in the source image 504 are similar (i.e., the transformation descriptors are similar) to two correspondingly adjacent regions in the reference image 502, then the reliability of the match is greater than when the corresponding matching regions in the reference image 504 are dissimilar. Transformation descriptors are similar when the difference in a translation, scale, rotation, color transformation, or other component of the transformation descriptor is smaller than a threshold value. For example, transformation descriptors may be similar when the difference between the translation vectors is less than 10 pixels and difference between the rotation vectors is less than 15 degrees.

In the next step of the coarse-to-fine correspondence algorithm, a color transformation model is generated based on the reliably consistent regions. The color transformation model approximates the differences in color intensity for similar regions between the reference image 502 and the source image 504. Finally, the search range of the nearest-neighbor search is adjusted for a next iteration of the four steps at a different scale. The scale corresponds to the size of the regions of pixels. One example algorithm implemented by the DC block 510 is described in further detail in HaCohen, et al., "Non-Rigid Dense Correspondence with Applications for Image Enhancement," ACM ToG (Proceedings of SIGGRAPH, vol. 30, 2011, 70:1-70:9, incorporated herein by reference in its entirety. In another embodiment, a scale-invariant feature transform (SIFT) flow algorithm is used to match regions in the source image 504 to regions in the reference image 502, by aligning an image to one or more images, included in a body of images of various scenes, that are determined to be the nearest neighbors of the original image. It will be appreciated that other correspondence algorithms may be implemented in lieu of the algorithms described above and that such algorithms are within the scope of the present invention.

The DC block 510 generates a correspondence map that associates pixels (or regions of pixels) in the source image 504 with corresponding pixels (or regions of pixels) in the reference image. In one embodiment, for each region of the source image 504 having a corresponding region in the reference image 502, the correspondence map stores a transformation descriptor that identifies the corresponding region of the reference image 502. For example, the transformation descriptor could include a translation vector that specifies the location of the region in the reference image 502 relative to the location of the region in the source image 504 (i.e., a vector from the pixel index at the center of one region to the pixel index at the center of the corresponding region). The transformation descriptor could also include a scale vector, rotation vector, a color transformation vector, or other vectors that specify the transformation between pixels (or regions of pixels) of the source image 504 and pixels (or regions of pixels) of the reference image 502.

Figure 6:
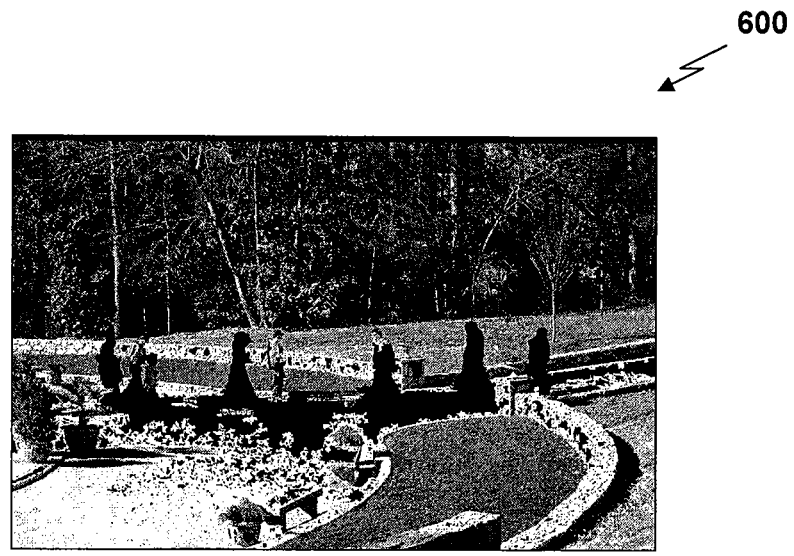
FIG. 6 illustrates a warped source image generated by the warp block of the image processing algorithm of FIG. 5, according to one embodiment of the present invention.

The DC block 510 outputs the source image 504 and the correspondence map to the warp block 520, which generates a warped source image based on the source image 504 and the correspondence map. The warp block 520 generates the warped source image by forward-warping the pixels of the source image 504 to their destinations in the warped source image based on the correspondence map. Because the DC block 510 may not have found a reliable consistent match for each and every pixel in the source image 504, the warped source image may contain holes (i.e., undefined pixel values) for some pixels. Most conventional registration algorithms perform a backward-warping transformation that maps the each pixel in the target image to a corresponding pixel in the source image. However, target pixels may include inconsistent data due to diverging objects or previously occluded pixels. The warp block 520 does not fill the holes with inconsistent data. FIG. 6 illustrates a warped source image 600 generated by the warp block 520 of the image processing algorithm 500 of FIG. 5, according to one embodiment of the present invention. The holes in the warped source image 600 are shown as the black pixels in the warped source image 600.

Returning now to FIG. 5, the DC block 510 outputs the reference image 502, the source image 504 and the correspondence map to the color transfer function (CTF) block 530, which generates a color transfer function for each color channel of the source image 504. The CTF block 530 fits a function to a subset of pixels from reliably consistent regions defined by the correspondence map. In one embodiment, the CTF block 530 may adapt a fitting process to account for outliers generated by inaccurate correspondence matches. In some embodiments, the third step of the coarse-to-fine correspondence algorithm of the DC block 510, described above, may be similar to the function of the CTF block 530. In one embodiment, the DC block 510 and the CTF block 530 may work in an iterative matter performing a nearest-neighbor search and region aggregation in the DC block 510 and then generating a color transfer function in the CTF block 530 using a potential correspondence map, before returning processing to the DC block 510 to adjust the search range in another iteration. In another embodiment, the DC block 510 may calculate preliminary color transfer functions for the coarse-to-fine correspondence algorithm and, once the final correspondence map has been generated, the CTF block 530 generates the color transfer functions, potentially using a different fitting algorithm, for use in downstream processing.

Figure 7:
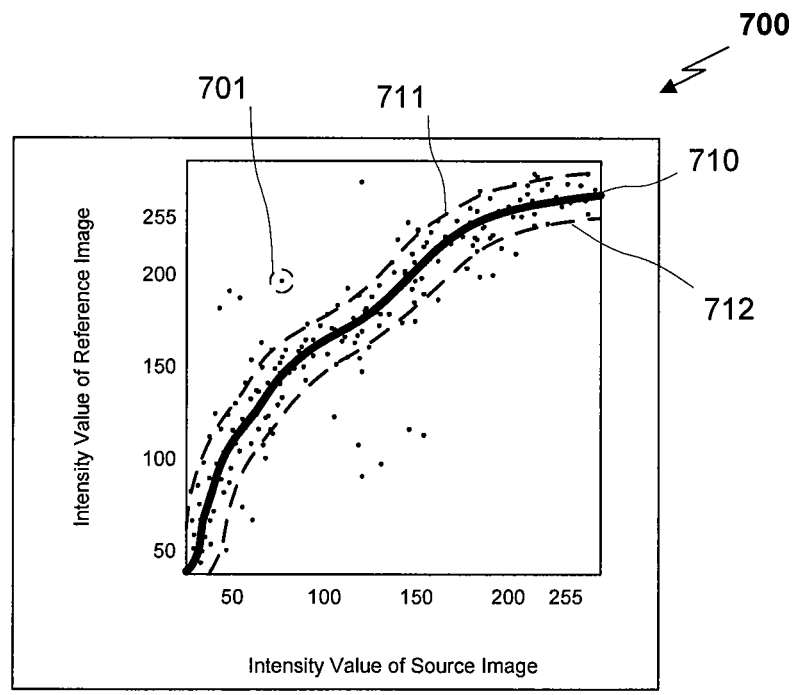
FIG. 7 illustrates a scatter graph comparing intensity values for a particular color channel for pixels in the source image and corresponding pixels in the reference image, according to one embodiment of the present invention.

In one embodiment, CTF block 530 may perform a curve fit based on the intensity value for pixels in the reliably consistent regions of the source image 504 as defined by the correspondence map. FIG. 7 illustrates a scatter graph 700 comparing intensity values for one color channel of pixels in the source image 504 and corresponding pixels in the reference image 502, according to one embodiment of the present invention. The relationship between the corresponding intensity values are plotted on scatter graph 700. As shown in FIG. 7, point 701 in scatter graph 700 represents the intensity value of one channel for a pixel in the source image 504 relative to the intensity value of the channel for a corresponding pixel in the reference image 502. The corresponding pixels are derived from the correspondence map generated by the DC block 510. For example, pixel 701 has an intensity value of approximately 80 in the source image 504. The CTF block 530 determines a corresponding pixel in the reference image 502 using the transformation descriptor from the correspondence map. In this case, the corresponding pixel has an intensity value of approximately 190 in the reference image 502.

CTF block 530 populates the scatter graph 700 using a subset of pixels selected from reliably consistent regions of the source image 504. Barring noise, the change of RGB values (or CMYK values, etc.) for correctly matched pixels between the source image 504 and the reference image 502 should follow the same transformation. It will be appreciated that working in a compressed color space domain, the mapping of the colors is not linear. In one embodiment, CTF block 530 works directly in the sRGB color space. The CTF block 530 adapts the curve fit technique of the DC block 510 to account for inaccurate matches. Essentially, CTF block 530 generates a color transfer function than minimizes the mean squared error. The error is equal to the difference between the intensity value for a pixel in the source image 504 and the intensity value for a corresponding pixel in the reference image 502 as transformed according to the color transfer function.

However, as shown in scatter graph 700, the curve may be inaccurate due to the presence of outliers. Because the correspondence algorithm of the DC block 510 is not 100% accurate, the correspondence map will include some mismatched pixels. Therefore, some of the points in scatter graph 700, such as point 701, should not contribute to the color transfer function. In one embodiment, to generate a more accurate color transfer function, the CTF block 530 implements a random sample consensus (RANSAC) algorithm. RANSAC is a non-deterministic, iterative algorithm to derive a mathematical model from a set of data that includes outliers. First, the CTF block 530 selects a subset of pixels from the reliably consistent regions as hypothetical inliers (i.e., correctly matched pixels). In one embodiment, the range of intensity values for all pixels in the reliably consistent regions is divided into k equal and non-overlapping intervals, and one pixel from each of the k intervals is selected as a hypothetical inlier. For example, setting k equal to 7 (i.e., 7 samples) may result in a decent approximation. While too few samples may result in an inaccurate curve fit, too many samples may cause over fitting of certain regions of the source image (i.e., many samples selected from a small area of the image). In another embodiment, samples are only selected if the intensity values of the samples monotonically increase (i.e., as the intervals increase in intensity value, so to should the intensity values of the samples).

Once the hypothetical inliers are selected, the CTF block 530 fits a potential color transfer function 710 to the set of hypothetical inliers. The other pixels in the reliably consistent regions are tested against the potential color transfer function 710, and the CTF block 530 determines if each pixel is a close fit to the potential color transfer function. A pixel is a close fit if, in the scatter graph 700, the pixel falls within the upper threshold 711 and the lower threshold 712 limits. The total number of pixels that closely fit the potential color transfer function are counted. The process is then repeated n number of times, selecting a different subset of hypothetical inliers during each iteration, and the potential color transfer function having the largest number of pixels that closely fit the potential color transfer function is selected as the color transfer function for that particular color channel.

Returning to FIG. 5, hole-filling (HF) block 540 receives the warped source image 600 from warp block 520, the color transfer functions from CTF block 530, and the reference image 502. HF block 540 implements a hole filling algorithm to fill in the missing pixels of the warped source image 600. First, HF block 540 attempts to find a first approximation of the final result by estimating the result using the color transfer functions to synthesize the hole using pixel values from the reference image 502. Then, HF block 540 attempts to recover the final values from the source image 504. If the hole region is small, it may be possible to approximate the pixel values in the hole region as a transformation from the source image 504 with a local homograph $H_i$.

Figure 8:
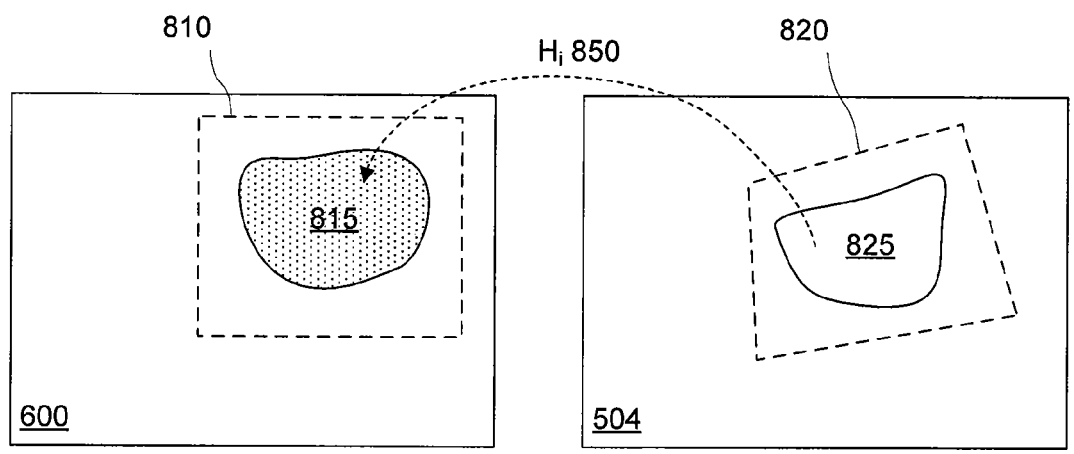
FIG. 8 illustrates the hole-filling algorithm of the HF block of FIG. 5, according to one embodiment of the present invention.

FIG. 8 illustrates the hole-filling algorithm of the HF block 540 of FIG. 5, according to one embodiment of the present invention. As shown in FIG. 8, HF block 540 receives the warped source image 600 that includes one or more hole regions 815. HF block 540 then generates a bounding box 810 around each hole region 815. In one embodiment, the bounding box 810 is at least k pixels (k>0) in each dimension greater than the minimum bounding box that completely encloses the hole region 815. As FIG. 8 makes clear, the bounding box 810 includes a set of pixels within the hole region 815 as well as a set of pixels outside the hole region 815 that have a reliable correspondence defined by the correspondence map. HF block 540 estimates a local homography $H_i$ 850 (i.e., local transformation) based on a subset of pixels $M_i$ having reliably consistent correspondence within the bounding box 810. HF block 540 selects J pixels from the set of reliably consistent pixels Mi in bounding box 810 and fits an estimated homography $H_i$ 850 to the set of J pixels. Estimated homography $H_i$ 850 approximates a rigid transformation of corresponding region 825 to the hole region 815. The process may be performed in multiple iterations using different subsets of J pixels and the best estimate of the local homography $H_i$ 850 may be determined using the RANSAC technique.

Returning now to FIG. 5, DNRM block 550 detects non-rigid motion in the hole region 815. In other words, the reliability of the estimate for the rigid transformation based on local homography $H_i$ 850 is checked. A ratio of the number of inliers in the set $M_i$ to the total number of pixels in $M_i$ is calculated. The number of inliers are determined by looking at the difference of the estimated pixel values generated based on the transformation of the source image 504 from the local homography $H_i$ 850 to the pixel values specified by the warped source image 600. If the differences are small, then that pixel is added to the set of inliers. A ratio is calculated by dividing the number of pixels in the set of inliers by the total number of pixels in $M_i$. If the ratio is above a threshold value, then the hole region 815 is filled using the gradient 562 generated by transforming the source image 504 based on the local homography $H_i$ 850. However, if the ratio is below the threshold value, then the hole region 815 is filled using the gradient 561 generated by transforming the reference image 502 based on the color transfer functions. Gradients are blended into the results (i.e. registered image 506) by blending block 560. In one embodiment, blending block 560 implements a Poisson blending algorithm, as known by those of skill in the art.

Figure 9:
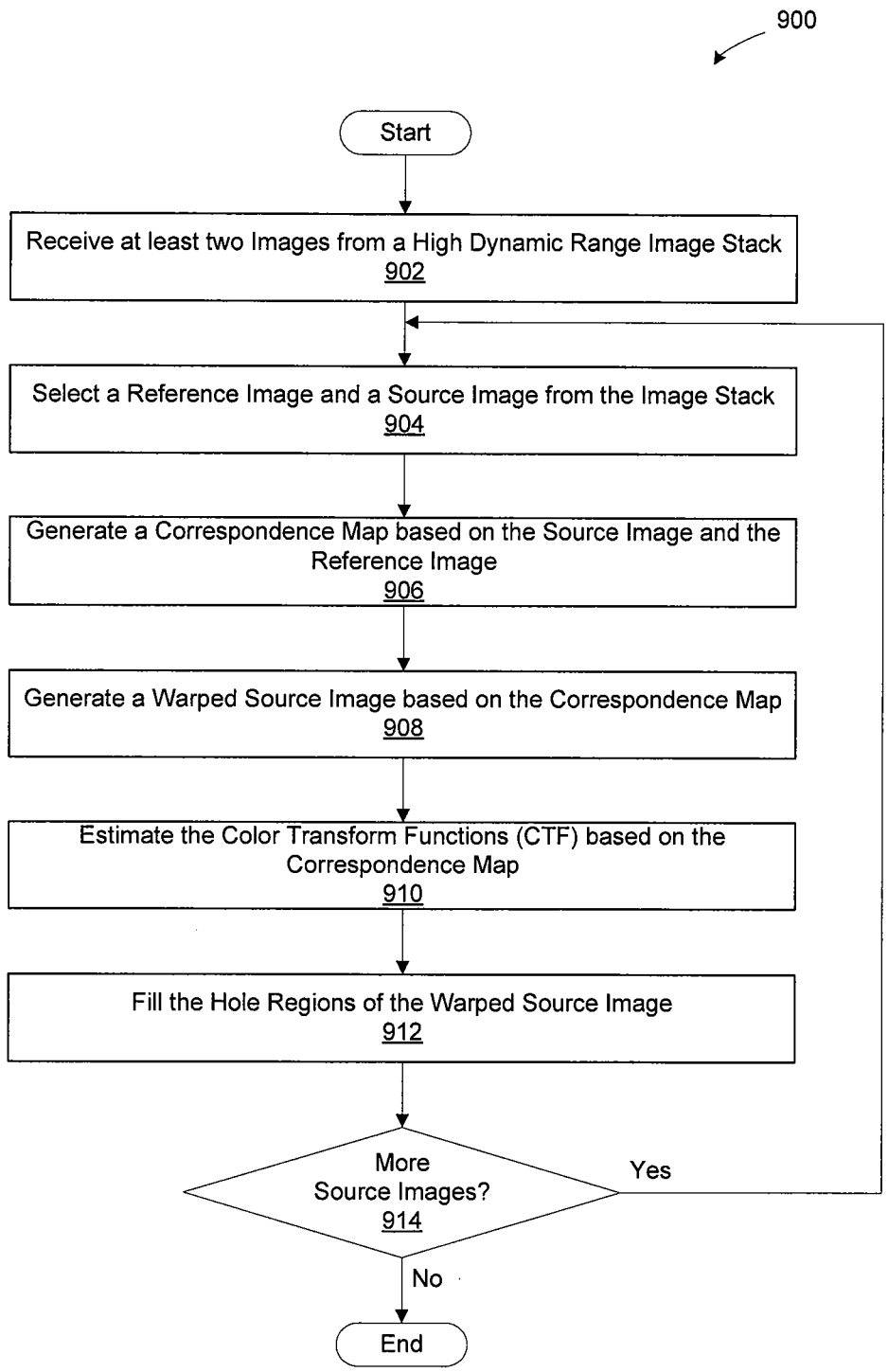
FIG. 9 is a flow diagram of methods steps for registering a set of images for use in high-dynamic range imaging, according to one embodiment of the present invention.

FIG. 9 is a flow diagram of methods steps for registering a set of images for use in high-dynamic range imaging, according to one embodiment of the present invention. Although the method steps are described in conjunction with the systems of FIGS. 1-8, persons of ordinary skill in the art will understand that any system configured to perform the method steps, in any order, is within the scope of the present invention.

The method 900 begins at step 902, where IPP 250 receives a set of images. The set of images are captured using different camera settings and intended to be composited or blended to create a high-dynamic range image. At step 904, IPP 250 selects a reference image 502 from the set of images. In one embodiment, the reference image 502 is selected based on the saturation level of the pixels in each of the images. In another embodiment, a user indicates, using conventional input devices such as a keyboard, mouse, or other interface devices (e.g., buttons on a hand-held device) which image to select as the reference image 502. At least one image of the remaining images is selected as a source image 504. At step 906, IPP 250 generates a correspondence map for the source image that indicates a correspondence between a subset of pixels in the source image 504 and a subset of pixels in the reference image 502. In one embodiment, IPP 250 includes a DC block 510 that generates the correspondence map using a coarse-to-fine correspondence algorithm.

At step 908, IPP 250 generates a warped source image 600 based on the correspondence map. In one embodiment, IPP 250 includes a warp block 520 that is configured to forward-warp pixels of the source image 504 to target pixels of the warped source image 600 based on transformation descriptors specified in the correspondence map. The warped source image 600 includes hole regions having pixels that are not associated with any pixels in the source image. At step 910, IPP 250 estimates color transfer functions for each color channel of the source image 504 based on the difference in intensity values of the set of pixels in the source image 504 and intensity values of the corresponding set of target pixels in the warped source image 600. At step 912, IPP 250 fills the holes in the warped source image to generate a registered image 506 for the source image 504.

At step 914, IPP 250 determines whether there are more source images 504 and, if there are more source images 504, then method 900 returns to step 904, where IPP 250 selects another source image 504 and repeats steps 904 through 914 for the new source image 504. However, if there are no more source images 504, then method 900 terminates.

Figure 10:
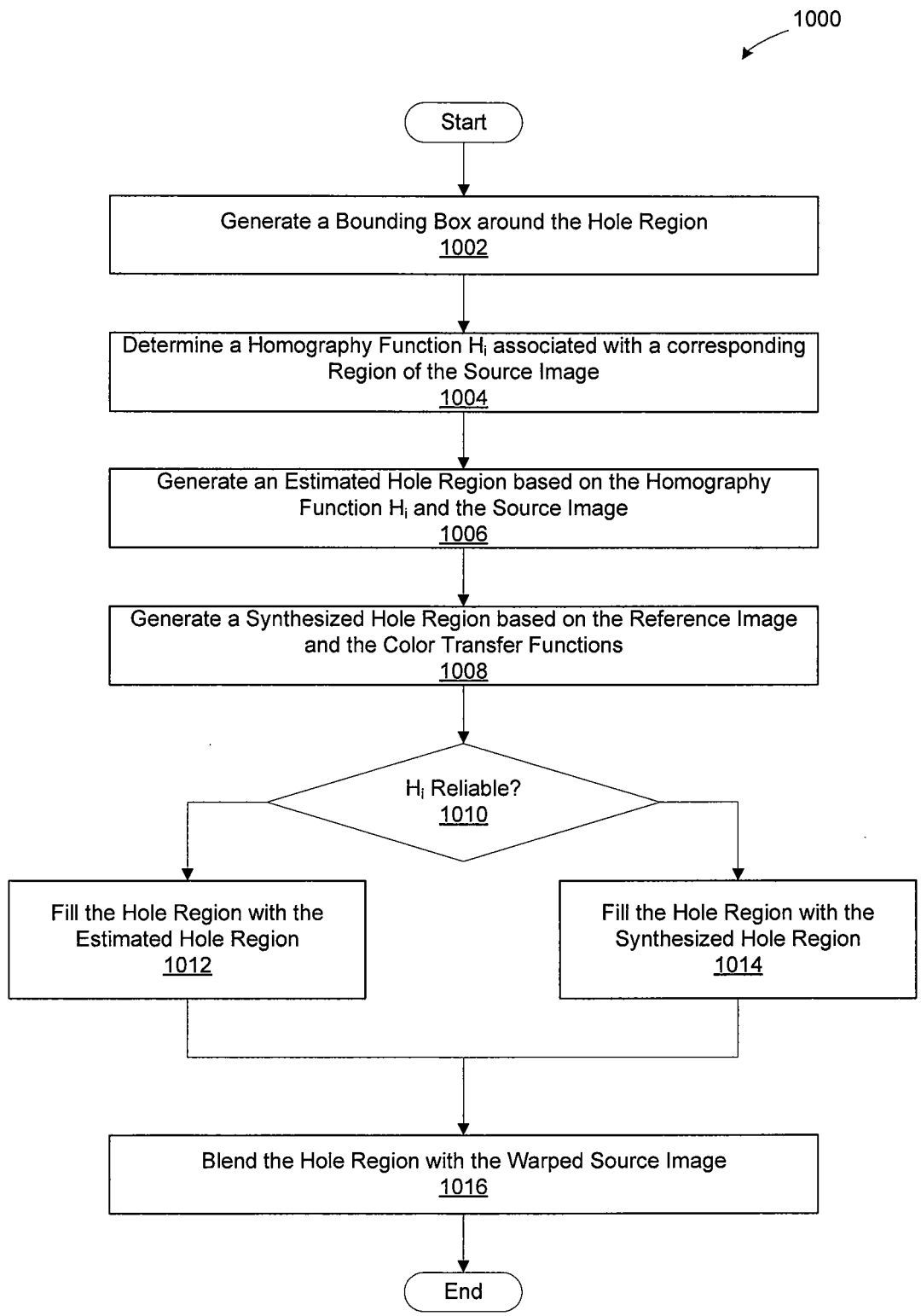
FIG. 10 is a flow diagram of methods steps for filling holes in a warped source image, according to one embodiment of the present invention.

FIG. 10 is a flow diagram of methods steps for filling holes in a warped source image, according to one embodiment of the present invention. Although the method steps are described in conjunction with the systems of FIGS. 1-8, persons of ordinary skill in the art will understand that any system configured to perform the method steps, in any order, is within the scope of the present invention.

The method 1000 begins at step 1002, where, for each hole region in the warped source image, IPP 250 generates a bounding box around the hole region 815 in the warped source image 600. At step 1004, IPP 250 determines a homography function $H_i$ 850 which approximates a rigid transformation of a corresponding region 825 in the source image 504. In one embodiment, a RANSAC algorithm is implemented in order to estimate the homography Function $H_i$ 850. At step 1006, IPP 250 generates an estimated hole region by transforming the corresponding region in the source image 504 based on the homography function. In one embodiment, a gradient 562 is generated by transforming the source image 504 based on the local homography function $H_i$ 850. At step 1008, IPP 250 generates a synthesized hole region based on the reference image and the color transfer functions for each color channel. In one embodiment, a gradient 561 is generated by transforming the reference image 502 based on the color transfer functions.

At step 1010, IPP 250 determines the reliability of the homography function $H_i$ 850. In one embodiment, IPP determines the reliability based on a ratio of the number of inliers for the homography function $H_i$ 850 compared to the number of pixels in a subset of the bounding box 810. If the homography function $H_i$ 850 is reliable, then method 1000 proceeds to step 1012 where IPP 250 fills the hole region 815 using the estimated hole region. However, if the homography function $H_i$ 850 is not reliable, then method 1000 proceeds to step 1014, where IPP 250 fills the hole region 815 using the synthesized hole region. At step 1016, the hole region 815 is blended with the warped source image 600. In one embodiment, IPP 250 implements a Poisson blending algorithm. After step 1016, method 1000 terminates.

Initial Global Registration

Figure 11:
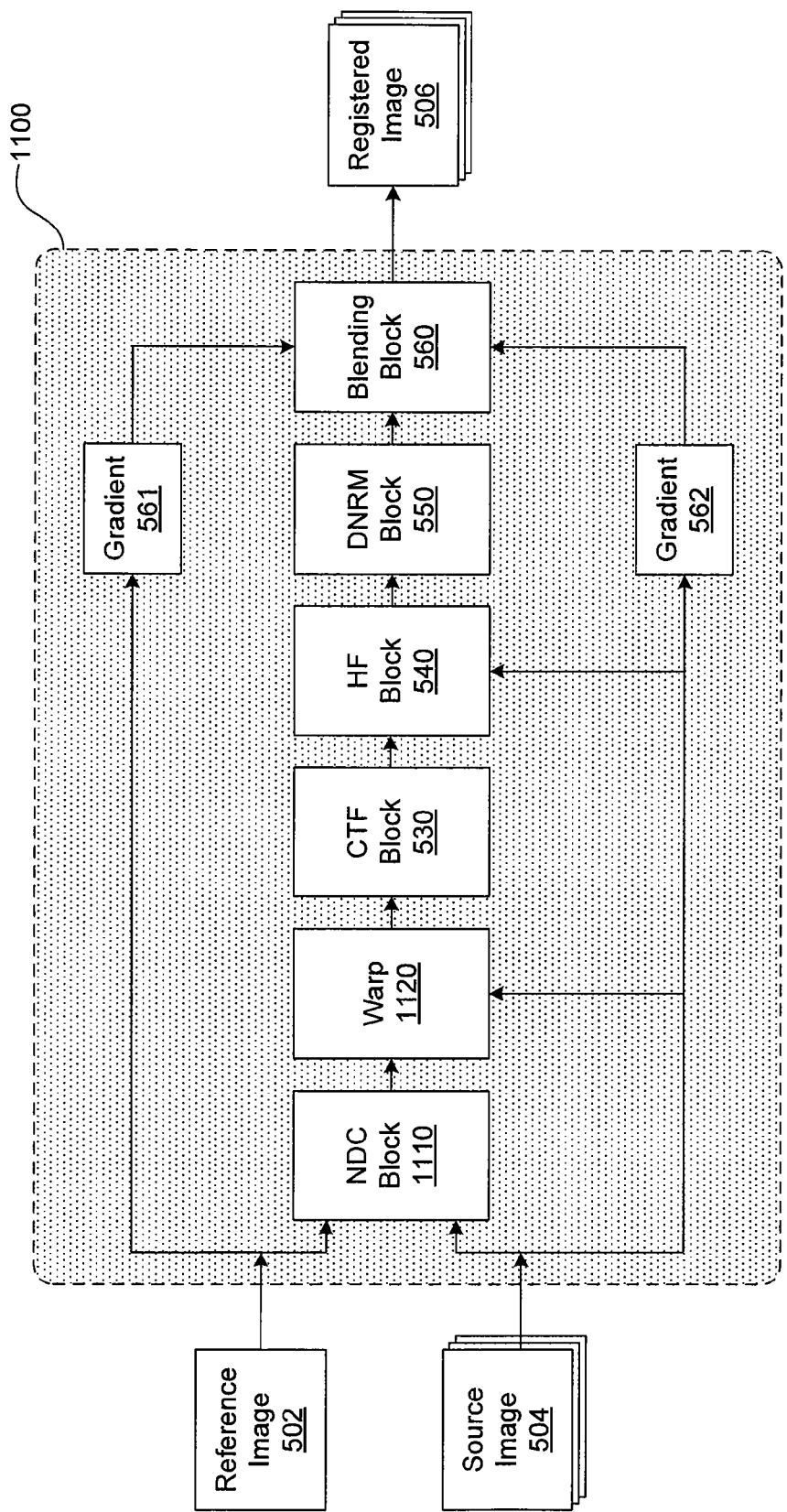
FIG. 11 is a block diagram of an image processing algorithm providing initial global registration to generate the blended image of FIG. 4B, according to another embodiment of the present invention.

FIG. 11 is a block diagram of an image processing algorithm 1100 providing initial global registration to generate the blended image of FIG. 4B, according to another embodiment of the present invention. Image processing algorithm 1100 represents a modification of image processing algorithm 500 of FIG. 5, whereby DC block is replaced with a non-dense correspondence estimator (NDC) block 1110. In one embodiment, image processing algorithm 1100 warps and modifies each image in an image stack to align each image with a selected reference image. Unlike conventional HDR image processing algorithms, image processing algorithm 1100 attempts to preserve as much information from each image 310 of FIG. 3 in the image stack 300 as possible. As with image processing algorithm 500, image processing algorithm 1100 does not require radiometric calibration and is thus suitable for approaches that fuse images in the luminance domain, in addition to being suitable for approaches that fuse images in the irradiance domain.

Image processing algorithm 1100 takes a reference image 502 and one or more source images 504 as input. For example, the fourth image 310(3) of the image stack 300 could be selected as the reference image 502 and the first image 310(0), second image 310(1), and the third image 310(2) could be selected as the source images 504. Image processing algorithm 1100 outputs one or more registered images 506 that are registered to reference image 502 and have a dynamic range that resembles corresponding source image 504.

In one embodiment, reference image 502 is selected automatically by selecting the image 310 in the image stack 300 having the fewest number of over-saturated or under-saturated pixels. In another embodiment, the reference image 502 is manually selected by a user. Once reference image 502 is selected, it and the source images 504 are transmitted to NDC 1110, which establishes a frame-level or global correspondence between pixels of source image 504 and pixels of the reference image 502. In one embodiment, NDC 1110 implements a non-dense correspondence estimator based on selected points within reference image 502 and a source image 504. One non-dense correspondence estimator generates a global perspective transform based the selected points.

Warp block 1120 functions similarly to warp block 520 of FIG. 5, however warp block 1120 operates on a global homography to perform warping operations rather than a correspondence map. In one embodiment, warp block 1120 receives the global homography from NDC 1110 and generates a warped source image by forward-warping pixels from source image 504 to destinations in the warped source image. By contrast, many conventional registration algorithms perform backward-warping transformations that map each pixel in the target image to a corresponding pixel in a source image. However, target pixels may include inconsistent data due to diverging objects or previously occluded pixels.

As described previously in conjunction with image processing algorithm 500, CFT block 530 generates a color transfer function for each color channel of source image 504. CTF block 530 fits a function to a subset of pixels from reliably consistent regions defined by the correspondence map. As described previously, CTF block 530 may adapt a fitting process to account for outliers generated by inaccurate correspondence matches. In short, CTF block 530 finds pixels that may potentially produce ghosting artifacts and removes such pixels to generate warped source image 600, which may include holes to be filled by HF block 540. As described previously, HF block 540 implements a hole filling algorithm to fill in missing pixels within warped source image 600, and DNRM block 550 detects non-rigid motion in a hole region comprising missing pixels for determining how best to fill in the missing pixels. Blending block 560 is configured to blend reference image 502 and warped source image 600. DNRM block 550 may implement any technically feasible algorithm, such as a Poisson blending algorithm.

Figure 12:
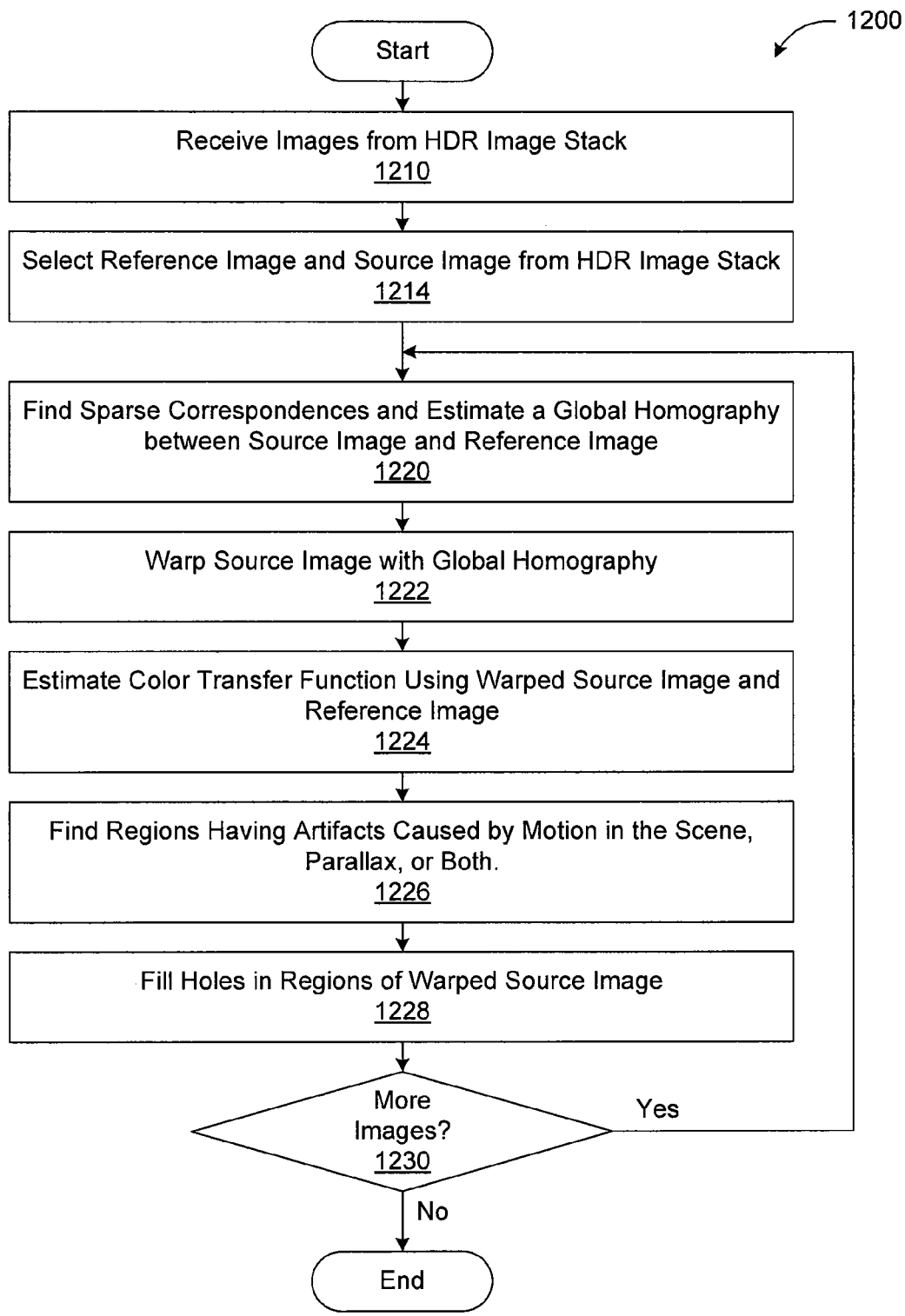
FIG. 12 is a flow diagram of method steps for registering a set of images for use in high-dynamic range imaging, according to another embodiment of the present invention.

FIG. 12 is a flow diagram of method steps for registering a set of images for use in high-dynamic range imaging, according to another embodiment of the present invention. Although the method steps are described in conjunction with the systems of FIGS. 1-8 and 11, persons of ordinary skill in the art will understand that any system configured to perform the method steps, in any order, is within the scope of the present invention.

The method 1200 begins in step 1210, where IPP 250 receives a set of images. The set of images are captured using different camera settings and intended to be composited or blended to create a high-dynamic range image. In step 1214, IPP 250 selects a reference image 502 from the set of images. In one embodiment, reference image 502 is selected based on the saturation level of the pixels in each of the images. In another embodiment, a user indicates, using conventional input devices such as a keyboard, mouse, or other interface devices (e.g., buttons on a hand-held device) which image to select as reference image 502. At least one image of the remaining images is selected as a source image 504. In step 1220, IPP 250 finds sparse correspondence between selected points in reference image 502 and source image 504 to estimate correspondence information. In one embodiment, the correspondence information comprises global homography between reference image 502 and source image 504. In one embodiment, IPP 250 includes an NDC block 1110, which is configured to generate the global homography between reference image 502 and source image 504 using a frame-level correspondence algorithm.

In step 1222, IPP 250 generates a warped source image, based on the global homography. In one embodiment, IPP 250 includes a warp block 1120 that is configured to warp pixels of the source image 504 to target pixels of the warped source image based on transformation descriptors specified in the global homography. In step 1224, IPP 250 estimates color transfer functions for each color channel of the source image 504 based on differences in intensity values of a set of pixels in the source image 504 and intensity values of a corresponding set of target pixels in the warped source image. In step 1226, IPP 250 finds regions having artifacts caused by motion in the scene, parallax, or both. In step 1228, IPP 250 fills the holes and the regions having artifacts in the warped source image to generate registered image 506 for source image 504. In one embodiment, step 1228 comprises method 1000.

If, in step 1230, IPP 250 determines that there are more source images 504, then method 1200 returns to step 1220, where IPP 250 selects another source image 504 and repeats steps 1220 through 1228 for the new source image 504. However, if there are no more source images 504, then method 1200 terminates.

In sum, a set of images is processed to modify and register the images to a reference image in preparation for blending the images to create a high-dynamic range image. To modify and register a source image to a reference image, a processing unit generates a global homography for the source image based on a global correspondence algorithm, generates a warped source image based on the global homography, estimates one or more color transfer functions for the source image, and fills the holes in the warped source image.

One advantage of the disclosed method is that the source images are warped using robust and computationally efficient techniques that blend together global correspondences, local rigid transformation estimates, and synthesized results from a reference image and a source image. The combination of disclosed global and detailed registration techniques may be implemented efficiently and may provide more robust results with less computational effort than conventional registration techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for registering a set of images, the method comprising:
   receiving the set of images, wherein the set of images includes a reference image and a source image;
   generating a global homography between the source image and the reference image that indicates a correspondence between a subset of pixels in the source image and a subset of pixels in the reference image;
   generating a warped source image by mapping a set of pixels in the source image to a set of target pixels in the warped source image, wherein the warped source image includes one or more hole regions comprising pixels in the warped source image that are not associated with the set of pixels in the source image;
   estimating one or more color transfer functions for the source image based on the difference between intensity values associated with the set of pixels in the source image and intensity values associated with corresponding pixels in the set of target pixels in the warped source image; and
   filling one or more hole regions of the warped source image based on at least one of the source image or the reference image.

2. The method of claim 1, wherein filling the one or more hole regions of the warped source image comprises:
   for each hole region:
      generating a bounding box around the hole region,
      determining a homography function that approximates a rigid transformation of a corresponding region in the source image, and
      generating an estimated hole region by transforming the corresponding region in the source image based on the homography function.

3. The method of claim 2, wherein filling the one or more hole regions of the warped source image further comprises:
   for each hole region:
      generating a synthesized hole region based on the reference image and the one or more color transfer functions for each color channel,
      calculating a reliability value for the homography function, and
      if the reliability value for the homography function is above a threshold value, then filling the hole region with the estimated hole region, or
      if the reliability value for the homography function is not above the threshold value, then filling the hole region with the synthesized hole region.

4. The method of claim 3, wherein determining the reliability value for the homography function comprises calculating a ratio of the number of pixels in a subset of pixels within the bounding box that agree with the homography function to the total number of pixels in the subset of pixels.

5. The method of claim 3, wherein filling the one or more hole regions of the warped source image further comprises, for each hole region, blending either the estimated hole region or the synthesized hole region with the warped source image.

6. The method of claim 1, wherein the global homography is generated prior to generating the warped source image, and the warped source image is generated prior to estimating the one or more color transfer functions.

7. The method of claim 1, wherein the set of images comprises a second source image, the method further comprising:
   generating a second a global homography between the source image and the reference image that indicates a correspondence between a subset of pixels in the second source image and a subset of pixels in the reference image;
   generating a second warped source image;
   estimating one or more color transfer functions for the second source image; and
   filling one or more hole regions of the second warped source image.

8. The method of claim 1, wherein the one or more color transfer functions are estimated via an iterative random sampling consensus (RANSAC) process.

9. A non-transitory computer-readable storage medium including instructions that, when executed by a processing unit, causes the processing unit to perform steps for registering a set of images, the steps comprising:
   receiving the set of images, wherein the set of images includes a reference image and a source image;
   generating a global homography between the source image and the reference image that indicates a correspondence between a subset of pixels in the source image and a subset of pixels in the reference image;
   generating a warped source image by mapping a set of pixels in the source image to a set of target pixels in the warped source image, wherein the warped source image includes one or more hole regions comprising pixels in the warped source image that are not associated with the set of pixels in the source image;
   estimating one or more color transfer functions for the source image based on the difference between intensity values associated with the set of pixels in the source image and intensity values associated with corresponding pixels in the set of target pixels in the warped source image; and
   filling one or more hole regions of the warped source image based on at least one of the source image or the reference image.

10. The computer-readable storage medium of claim 9, wherein filling the one or more hole regions of the warped source image comprises:
    for each hole region:
       generating a bounding box around the hole region,
       determining a homography function that approximates a rigid transformation of a corresponding region in the source image, and
       generating an estimated hole region by transforming the corresponding region in the source image based on the homography function.

11. The computer-readable storage medium of claim 10, wherein filling the one or more hole regions of the warped source image further comprises:
    for each hole region:
       generating a synthesized hole region based on the reference image and the one or more color transfer functions for each color channel,
       calculating a reliability value for the homography function, and
       if the reliability value for the homography function is above a threshold value, then filling the hole region with the estimated hole region, or
       if the reliability value for the homography function is not above the threshold value, then filling the hole region with the synthesized hole region.

12. The computer-readable storage medium of claim 11, wherein determining the reliability value for the homography function comprises calculating a ratio of the number of pixels in a subset of pixels within the bounding box that agree with the homography function to the total number of pixels in the subset of pixels.

13. The computer-readable storage medium of claim 11, wherein filling the one or more hole regions of the warped source image further comprises, for each hole region, blending either the estimated hole region or the synthesized hole region with the warped source image, and wherein blending is based on a Poisson blending algorithm.

14. The computer-readable storage medium of claim 9, wherein the set of images comprises a second source image, the method further comprising:
   generating a second correspondence map for the second source image that indicates a correspondence between a subset of pixels in the second source image and the subset of pixels in the reference image;
   generating a second warped source image;
   estimating one or more color transfer functions for the second source image; and
   filling one or more hole regions of the second warped source image.

15. The computer-readable storage medium of claim 9, wherein the global homography is generated prior to generating the warped source image, and the warped source image is generated prior to estimating the one or more color transfer functions.

16. A system configured to register a set of images for use in high-dynamic range imaging, the system comprising:
   a memory storing the set of images, wherein the set of images includes a reference image and a source image;
   a processing unit coupled to the memory and configured to:
      receive the set of images, wherein the set of images includes a reference image and a source image;
      generate a global homography between the source image and the reference image that indicates a correspondence between a subset of pixels in the source image and a subset of pixels in the reference image;
      generate a warped source image by mapping a set of pixels in the source image to a set of target pixels in the warped source image, wherein the warped source image includes one or more hole regions comprising pixels in the warped source image that are not associated with the set of pixels in the source image;
      estimate one or more color transfer functions for the source image based on the difference between intensity values associated with the set of pixels in the source image and intensity values associated with corresponding pixels in the set of target pixels in the warped source image; and
      fill one or more hole regions of the warped source image based on at least one of the source image or the reference image.

17. The system of claim 16, wherein, to fill the one or more hole regions of the warped source image, the processing unit is further configured to:
   for each hole region:
      generate a bounding box around the hole region,
      determine a homography function that approximates a rigid transformation of a corresponding region in the source image, and
      generate an estimated hole region by transforming the corresponding region in the source image based on the homography function.

18. The system of claim 17, wherein, to fill the one or more hole regions of the warped source image, the processing unit is further configured to:
   for each hole region:
      generate a synthesized hole region based on the reference image and the one or more color transfer functions,
      calculating a reliability value for the homography function, and
      if the reliability value for the homography function is above a threshold value, then filling the hole region with the estimated hole region, or
      if the reliability value for the homography function is not above the threshold value, then filling the hole region with the synthesized hole region.

19. The system of claim 16, wherein the processing unit comprises a system on a chip (SoC), and wherein the system further comprises an image sensor for capturing the set of images.

20. The system of claim 16, wherein the processing unit comprises a programmable graphics processing unit (GPU).

* * * * *